(12) United States Patent
Olson et al.

(10) Patent No.: US 9,770,651 B2
(45) Date of Patent: Sep. 26, 2017

(54) STORYTELLING ENVIRONMENT: INTERACTIVE DEVICES WITH INTEGRATED MEMORY COMPONENT

(71) Applicant: Disney Enterprises, Inc., Burbank, CA (US)

(72) Inventors: Joseph L. Olson, Los Angeles, CA (US); Eric C. Haseltine, Silver Spring, MD (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 238 days.

(21) Appl. No.: 14/633,085

(22) Filed: Feb. 26, 2015

(65) Prior Publication Data

US 2015/0238854 A1   Aug. 27, 2015

Related U.S. Application Data

(60) Provisional application No. 61/944,934, filed on Feb. 26, 2014.

(51) Int. Cl.
  *A63H 29/22* (2006.01)
  *A63F 13/235* (2014.01)
  *A63H 3/00* (2006.01)
  *A63F 13/98* (2014.01)
  *A63F 13/77* (2014.01)

(52) U.S. Cl.
  CPC ............ *A63F 13/235* (2014.09); *A63F 13/77* (2014.09); *A63F 13/98* (2014.09); *A63H 3/003* (2013.01); *A63H 2200/00* (2013.01)

(58) Field of Classification Search
  None
  See application file for complete search history.

(56) References Cited

U.S. PATENT DOCUMENTS

| | | | | |
|---|---|---|---|---|
| 5,730,638 | A  * | 3/1998 | Ward | A63H 3/28 362/108 |
| 6,190,174 | B1 * | 2/2001 | Lam | A63H 33/42 273/237 |
| 6,773,325 | B1 * | 8/2004 | Mawle | A63F 13/02 446/175 |
| 2003/0220044 | A1* | 11/2003 | Andrews | A63H 30/04 446/268 |

(Continued)

*Primary Examiner* — Jason Yen
(74) *Attorney, Agent, or Firm* — Patterson + Sheridan, LLP

(57) ABSTRACT

Embodiments generally relate to toy devices having an embedded memory for use in a storytelling environment. One embodiment provides a toy device that includes a memory storing data representing a plurality of effects. The toy device includes a memory bus communicatively coupled to the memory and a communication port communicatively coupled to the memory bus. An action disc device connected to the communication port can retrieve at least a portion of the stored data for playback over the communication port. The action disc device is configured to, upon detecting that a corresponding stimulus condition has been satisfied, retrieve data from the memory corresponding to one of the plurality of effects for playback using the communication port. The toy device further includes a connector mechanism to which the action disc device can be removably attached, while the action disc device is connected to the communication port.

18 Claims, 9 Drawing Sheets

(56) References Cited

U.S. PATENT DOCUMENTS

| | | | |
|---|---|---|---|
| 2006/0128463 A1* | 6/2006 | Okada | G07F 17/32 |
| | | | 463/29 |
| 2006/0178204 A1* | 8/2006 | Okada | G07F 17/3211 |
| | | | 463/20 |
| 2006/0239469 A1* | 10/2006 | Gil | A63H 3/28 |
| | | | 381/81 |
| 2006/0292963 A1* | 12/2006 | Sun | A63H 5/00 |
| | | | 446/268 |
| 2010/0164865 A1* | 7/2010 | Hirano | G06Q 10/00 |
| | | | 345/156 |
| 2013/0072083 A1* | 3/2013 | Ghaly | A63H 3/52 |
| | | | 446/91 |
| 2013/0288563 A1* | 10/2013 | Zheng | A63H 3/36 |
| | | | 446/268 |
| 2014/0011428 A1* | 1/2014 | Barthold | A63H 3/003 |
| | | | 446/268 |

* cited by examiner

STORYTELLING ENVIRONMENT: INTERACTIVE DEVICES WITH INTEGRATED MEMORY COMPONENT

CROSS-REFERENCE TO RELATED APPLICATIONS

This application claims benefit of U.S. provisional patent application Ser. No. 61/944,934, filed Feb. 26, 2014, which is herein incorporated by reference in its entirety.

BACKGROUND

Field of the Invention

The present invention generally relates to home entertainment, and more specifically to techniques for providing an immersive playtime environment using interactive devices.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Generally, with respect to audio equipment, sound quality and cost savings are frequently at odds with one another. That is, while high quality audio equipment can be manufactured that produces very high quality audio output, such audio equipment is typically expensive to produce. Likewise, inexpensive audio output devices can be manufactured frequently such devices are limited in terms of the frequencies they can output and generally the sound quality is lower on very inexpensive devices. Moreover, some devices may lack the computing resources (e.g., processor, memory, communication module, etc.) to receive and playback high quality audio. For example a particular device may have insufficient memory capacity to store an uncompressed version of a particular audio effect, and thus such a device may be required to use a compressed, lower quality version of the audio effect.

SUMMARY

One embodiment provides a toy device that includes a memory storing data representing a plurality of effects. The toy device further includes a memory bus communicatively coupled to the memory. Additionally, the toy device includes a communication port communicatively coupled to the memory bus. An action disc device connected to the communication port can retrieve at least a portion of the stored data for playback over the communication port. The action disc device is configured to, upon detecting that a corresponding stimulus condition has been satisfied, retrieve data from the memory corresponding to one of the plurality of effects for playback using the communication port. The toy device also includes a connector mechanism to which the action disc device can be removably attached, while the action disc device is connected to the communication port.

Another embodiment provides an action disc device that includes one or more output devices. The action disc device also includes a communications adapter for communicatively connecting to a communication port of a toy device. Additionally, the action disc device includes a connector mechanism for removably attaching the action disc device to a toy device, while the action disc device is connected to a communication port of the toy device. The action disc device further includes logic configured to detect the communications adapter is connected to a first communication port of a first toy device, and to retrieve, using the communications adapter, effect data stored within a memory of the toy device for playback. The logic is further configured to, upon detecting that a corresponding stimulus condition has been satisfied, output the retrieved effect data for playback using the one or more output devices.

Yet another embodiment provides a system. The system includes a toy device, which includes a memory storing data representing a plurality of effects, a communication port communicatively coupled to the memory, and a connector mechanism. The system also includes an action disc device that includes one or more output devices, a communications adapter for communicatively connecting to the communication port of the toy device, and a connector mechanism for removably attaching the action disc device to the toy device, while the action disc device is connected to a communication port of a toy device. Additionally, the action disc device includes logic configured to detect the communications adapter is connected to the communication port of the toy device and to retrieve, using the communications adapter, the data stored within the memory of the toy device. The logic is further configured to, upon detecting that a corresponding stimulus condition has been satisfied, output the retrieved effect data for playback using the one or more output devices.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
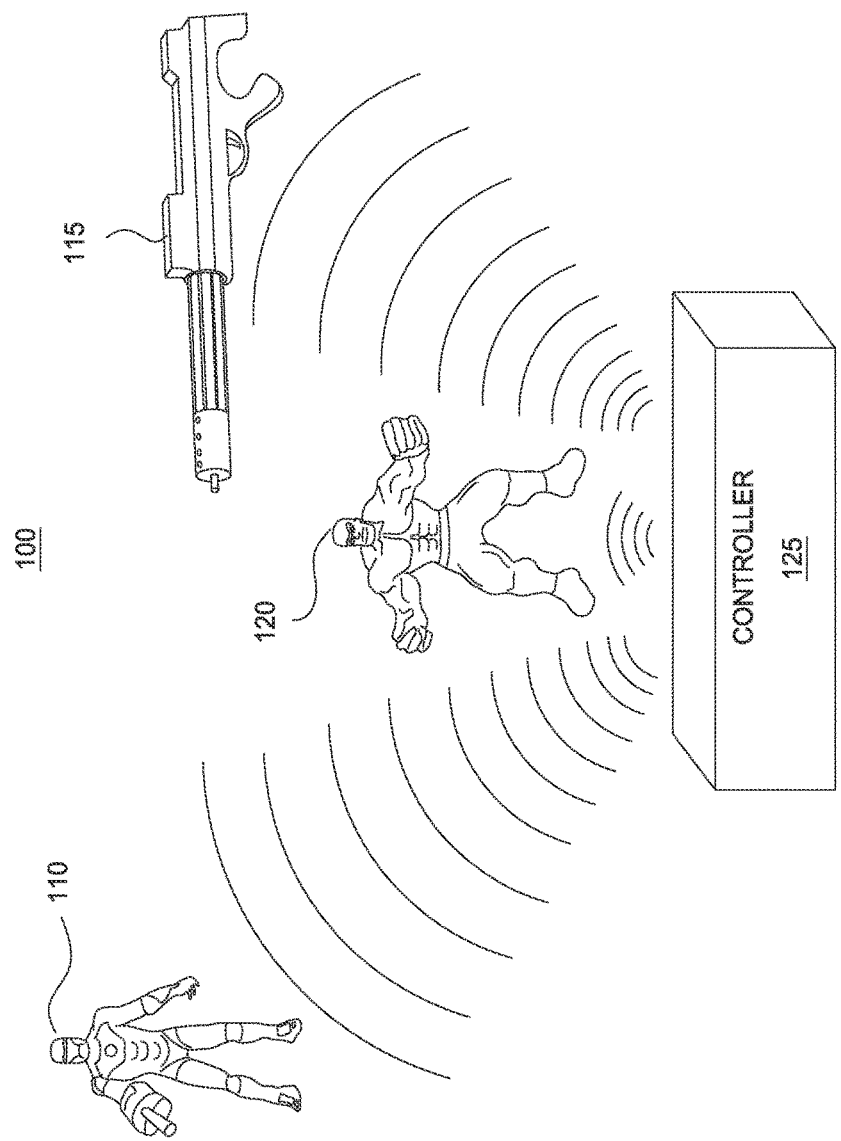
FIG. 1 illustrates a playtime environment in which a controller is instructing interactive devices, according to one embodiment described herein.

Generally, embodiments presented herein provide techniques for creating an immersive storytelling environment using one or more storytelling devices (also referred to as interactive devices). More specifically, embodiments may use various storytelling devices, each capable of producing some auditory and/or visual effect, to create an immersive and interactive storytelling experience for a user. Such a system may include a variety of storytelling devices and a controller, connected via a network (e.g., an RF communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audiovisual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a stand-alone device (e.g., a computing device executing a control application).

The various storytelling devices (also referred to as interactive devices) can include various different hardware components for use in playing out a story. For example, one device could include a higher quality speaker device capable of playing sound effects with a high quality while another device could include a lower quality speaker device capable of playing sound effects with only a moderate quality. By utilizing the various hardware components across all of the storytelling devices for the playback of the story, embodiments can mitigate the weaknesses of any particular storytelling device's hardware using the strengths of another storytelling device's hardware.

Moreover, other interactive devices may possess limited or no interactive capabilities. Such embodiments may be preferable, for example, when seeking to minimize the expense of manufacturing the toy devices, thereby making the toys available to consumers at a much lower price point. In such an embodiment, the interactivity of the toy devices may be achieved by configuring each of the inert toy devices with an action disc device. For instance, such an action disc device could include an infrared transceiver(s), a light-emitting device(s), a speaker device(s), a vibration device(s) and a spring-loaded actuator. Generally, the action disc device provides a modular way to incorporate interactivity into a compatible device (e.g., a toy action figure) within a networked ecosystem of devices. For instance, the action disc device could be configured to receive broadcasted commands from the controller device and to perform an audiovisual action in response (e.g., using one or more of the light-emitting devices, speaker devices, vibration devices and spring-loaded actuator).

Advantageously, using a modular device such as the action disc device allows simple, inexpensive toys to be configured to express complex behaviors and to interactively respond to their physical environment, thereby saving money relative to producing more complex toy devices including increased memory, radio-frequency (RF) circuits, and processing capabilities. Additionally, through the use of the spring-loaded actuator, the action disc device can help to conserve the cost and drain of the battery (as well as the required size of the battery) by using mechanically stored energy to produce audiovisual effects. For instance, the spring-loaded actuator could be triggered using a cam motion of a low-cost toy motor whose movement causes an object placed on the actuator (e.g., a toy device) to move or fall over. Moreover, the modular nature of the action disc device allows a user to reuse the capabilities of the action disc device by moving the device between toy devices, thus providing additional cost savings relative to incorporating the device's functionality into each and every toy device owned by the user.

For example, the controller could broadcast infrared signals to the action disc device in order to trigger discrete audiovisual effects (e.g., discrete expressions of movement, sound, light etc.). Additionally, the action disc device allows more sophisticated toy devices to control the action disc, in order to render a complex sequence of behaviors via a stream of infrared commands. In one embodiment, the controller employs an infrared protocol that uses a high brightness (e.g., around 100 mW at 940 nm) infrared light-emitting diodes (LEDs) to propagate carrier modulated signals (e.g., at 38 kHz) to TSOP infrared receivers in target devices (e.g., other toy devices each configured with a respective action disc device). Such a protocol can allow unicast, broadcast and multicast modes for controlling individual toys (or action discs) or multiple toys (or action discs) in sequence or synchrony. Doing so allows the action discs and their corresponding toy device (i.e., the device to which the action disc is attached) to appear to behave intelligently (e.g., in response to physical stimuli, in response to a context of a story, etc.), even though the action discs can be low cost devices and the logic providing the intelligence can reside elsewhere (e.g., controller).

For instance, in one embodiment, more sophisticated toys or the controller device can direct the actions of the action discs via transmitted infrared signals, in order to control the emission of sound, light, and motion from the action disc device. Additionally, such infrared signals can trigger scripts or macros stored within program memory or firmware within the action disc device, causing the device to perform a sequence of audiovisual effects. Moreover, such infrared signals can even be used to communicate in the absence of line-of-sight between the more sophisticated toy (or controller) and the action disc, through the use of high power output and sensitive infrared receivers.

As will be discussed in further detail below, some toy devices can be configured with an integrated memory component that stores data associated with the toy device. Such data could include, for example, an identifier for the toy device (e.g., indicating that the toy is a Hulk® action figure), sound data corresponding to the toy device (e.g., audio effects that provide dialogue for the Hulk® action figure), and stimulus event data (e.g., events that the Hulk® action figure should respond to and how the action figure should respond). Upon connecting an action disc device to the toy having the integrated memory component, the action disc device could retrieve this data and could use the data during the playback of a story. For example, the action disc device could output selective sound effects from the sound data on the integrated memory component.

An example will now be discussed with respect to FIG. 1, which illustrates a playtime environment in which a controller is instructing interactive devices to perform an effect, according to one embodiment described herein. As shown, the system 100 includes an Iron Man® action FIG. 110, a Star Wars® blaster rifle 115, a Hulk® action FIG. 120, and a controller device 125. Here, the toys 110, 115 and 120 are generally capable of producing audiovisual effects (e.g., audio output, light effects, movement effects such as vibration, etc.). In one embodiment, the toys 110, 115 and 120 may be configured with an action disc device (e.g., device 440 shown in FIG. 4 and discussed in more detail below). Of note, while various examples are discussed herein with respect to the toy devices 110, 115 and 120, it is broadly contemplated that these techniques can be utilized with any number of devices and any types of devices, consistent with the functionality described herein.

However, while the toys 110, 115 and 120 are capable of producing audiovisual effects, the toys 110, 115 and 120 may not be configured with logic to determine when conditions in the physical environment indicate a particular effect should be performed. This may be due to, in part, the cost and complexity of configuring each toy 110, 115 and 120 with the logic and hardware resources to detect stimuli in the physical environment and to perform a contextually appropriate audiovisual effect in response synchronously with other devices. As such, the toys 110, 115 and 120 could be configured to receive commands (e.g., from controller 125) and to perform an audiovisual effect(s) responsive to the received commands. Doing so allows the toys 110, 115 and 120 to be produced much more economically, while maintaining the capability to perform audiovisual effect(s) as part of a storytelling or playtime experience.

Moreover, as discussed above, one or more of the toys 110, 115 and 120 may be incapable of producing any audiovisual effects, but instead could include a coupler to connect the toy to an action disc device. The action disc device could include components capable of producing audiovisual effects (e.g., lights, speakers, vibration devices, etc.) and can serve as a modular way to add audiovisual effects to an otherwise inert toy. Moreover, the inert toy can be configured with an integrated memory device that stores data relating to the toy (e.g., sound effects for the character the Hulk®, where the toy device is a Hulk® action figure), and the action disc device can retrieve this data from the integrated memory for use in providing the audiovisual effects for the toy.

For example, as part of a Star Wars® storytelling experience, the storyline could indicate that devices within the physical environment should play a particular sound effect when the user performs a predefined gesture to use the "force." As such, the controller 125 could monitor the user's behavior to detect when the user has performed the pre-defined gesture. For example, the controller 125 could use one or more camera devices (e.g., within the controller devices 125, within one or more of the toys 110, 115 and 120, etc.) to monitor the user's movement within the physical environment. As another example, the user could wear an article (e.g., a bracelet) configured with an accelerometer device and capable of reporting data describing the user's movement to the controller device 125.

Upon detecting the user has performed the predefined gesture, the controller 125 could broadcast a command to the toy devices 110, 115 and 120 (or, e.g., to an action disc device connectively coupled to one of the toys 110, 115 and 120), instructing the toy devices 110, 115 and 120 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 110, 115 and 120, consistent with the functionality described herein.

The toy devices 110, 115 and 120 could then receive the command and could perform the specified audiovisual effect in synchrony. For example, in the event the command specifies to play a particular sound effect, each of the toy devices 110, 115 and 120 could output the particular sound effect in synchrony with the other toy devices, thereby creating an improved sensorial experience for the user, relative to any of the toy devices 110, 115 and 120 playing the sound effect individually. Here, the sound effect could be, e.g., a sampled sound effect or a function-generated sound effect. Moreover, as discussed above, by playing the sound effect synchronously with one another, the toy devices 110, 115 and 120 can compensate for each other's weaknesses (e.g., a particular toy device being capable of outputting sounds within a limited frequency range), thereby producing an improved sound effect and sensorial immersion for the user.

While any number of toy devices can be used, the sense of immersion experienced by the user generally scales with the number of devices performing audiovisual effects in synchrony. For example, the controller 125 could detect when the user pulls the trigger to fire the blaster gun 115, and in response, could broadcast a command to all of the toy devices 110, 115 and 120 to output the sound effect of the blast being fired. Additionally, the controller 125 could instruct the toy devices 110, 115 and 120 to perform additional audiovisual effects, such as flashing lights and movements, in response to the user firing the blaster. Doing so helps to overload the user's senses, thereby creating a more immersive and realistic playtime experience.

Generally, a variety of techniques may be used to configure the toy devices 110, 115 and 120 to synchronously output the audiovisual effect. In one embodiment, the toy devices 110, 115 and 120 could be configured to output the audiovisual effect immediately upon receiving the command from the controller 125. Such an embodiment may be preferable when the toy devices 110, 115 and 120 receive the command at substantially the same time and when the toy devices 110, 115 and 120 take substantially the same amount of time to process the command and to perform the corresponding audiovisual effect. As another example, each of the toy devices 110, 115 and 120 (as well as the controller 125) could maintain an internal clock whose time is synchronized to the internal clock of the other toy devices, and the command transmitted by the controller 125 could specify a time at which to perform the audiovisual effect. Generally, any technique suitable for use in synchronizing the internal clocks may be used, consistent with the present disclosure.

Examples of such techniques include, without limitation, Network Time Protocol (NTP), Precision Time Protocol (PTP), Reference Broadcast Time Synchronization, and so on.

In some cases, it may become desirable for the controller 125 to update the logic (or firmware) residing on the toy devices 110, 115 and 120. Such an update can include, for instance, updating the stimulus events the toy devices 110, 115 and 120 can respond to, updating the logic that controls how the toy devices 110, 115 and 120 behave and respond to stimulus events, updating data used by the toy devices 110, 115 and 120 (e.g., sound effect data), and so on. By updating the firmware of the toy devices in this fashion, embodiments can prolong the effective life of the toy devices by periodically updating and adding additional functionality to the toy devices.

Figure 2:
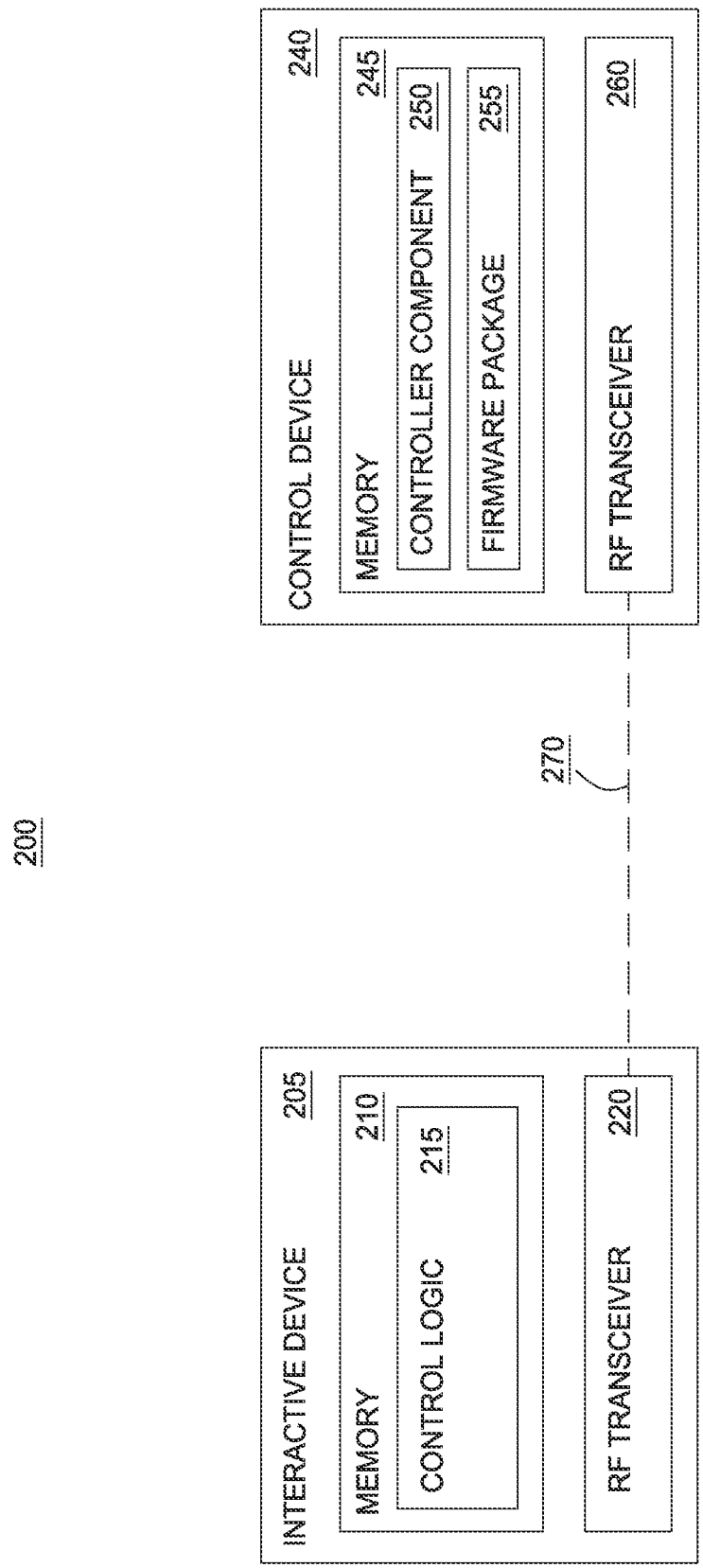
FIG. 2 is a block diagram illustrating an interactive device in communication with a controller device, according to one embodiment described herein.

An example of this is shown in FIG. 2, which is a block diagram illustrating an interactive device in communication with a controller device, according to one embodiment described herein. As shown, the system 200 includes an interactive device 205 and a control device 240, communicating via RF communications (shown by dashed line 270). The interactive device 205 includes an integrated memory 210 and an RF transceiver 220. The memory 210 contains control logic 215. The control logic 215 generally represents the logic and/or data controlling the behavior of the interactive device 205. The control device 240 includes memory 245 and an RF transceiver 260. The memory 245 includes a controller component 250 and a firmware package 255.

Here, the control device 240 can represent any device or computer system configured with an RF transceiver 260 and logic 250 for initiating a firmware update on the interactive device 205. Examples of such devices 240 include, without limitations, other interactive devices, mobile devices, tablet computer systems, laptop and desktop computer systems, and so on. The controller component 250 could obtain the firmware package 255 from any suitable location, e.g., a remote web server via the Internet. The controller component 250 could further determine that the firmware of the interactive device 205 should be updated (e.g., automatically upon determining the firmware package 255 is available, manually upon a user request, etc.) and could transmit the firmware package 255 to the interactive device 205 over RF communications using the RF transceiver 260.

Upon receiving the firmware package 255 via the RF transceiver 220, the control logic 215 on the interactive device 205 could determine a suitable time to install the firmware package. For example, if the interactive device 205 is currently involved in the playback of a story, the control logic 215 could determine that the firmware update should be postponed until the playback session is complete. Once the control logic 215 determines the firmware package 255 should be installed, the control logic 215 installs the firmware package 255 and initiates a system restart of the interactive device 205 to load the new firmware. In some embodiments, such a restart of the device may not be required, such as when the update is solely updating data files (e.g., audio data) stored on the interactive device 205.

In some embodiments, the control logic 215 is configured to update the firmware during the playback of the story, but to alter the device's 205 behavior in such a way that provides a thematically consistent explanation for the device going idle or even restarting during the firmware update. For example, in a Marvel® storytelling environment where the interactive device 205 is an Iron Man® action figure, the control logic 215 could alter the playback of the story to reference a systems reboot for the Iron Man® suit of armor, thereby providing a thematically consistent explanation for the interactive device 205 restarting to perform the firmware update using the received firmware package 255.

Figure 3:
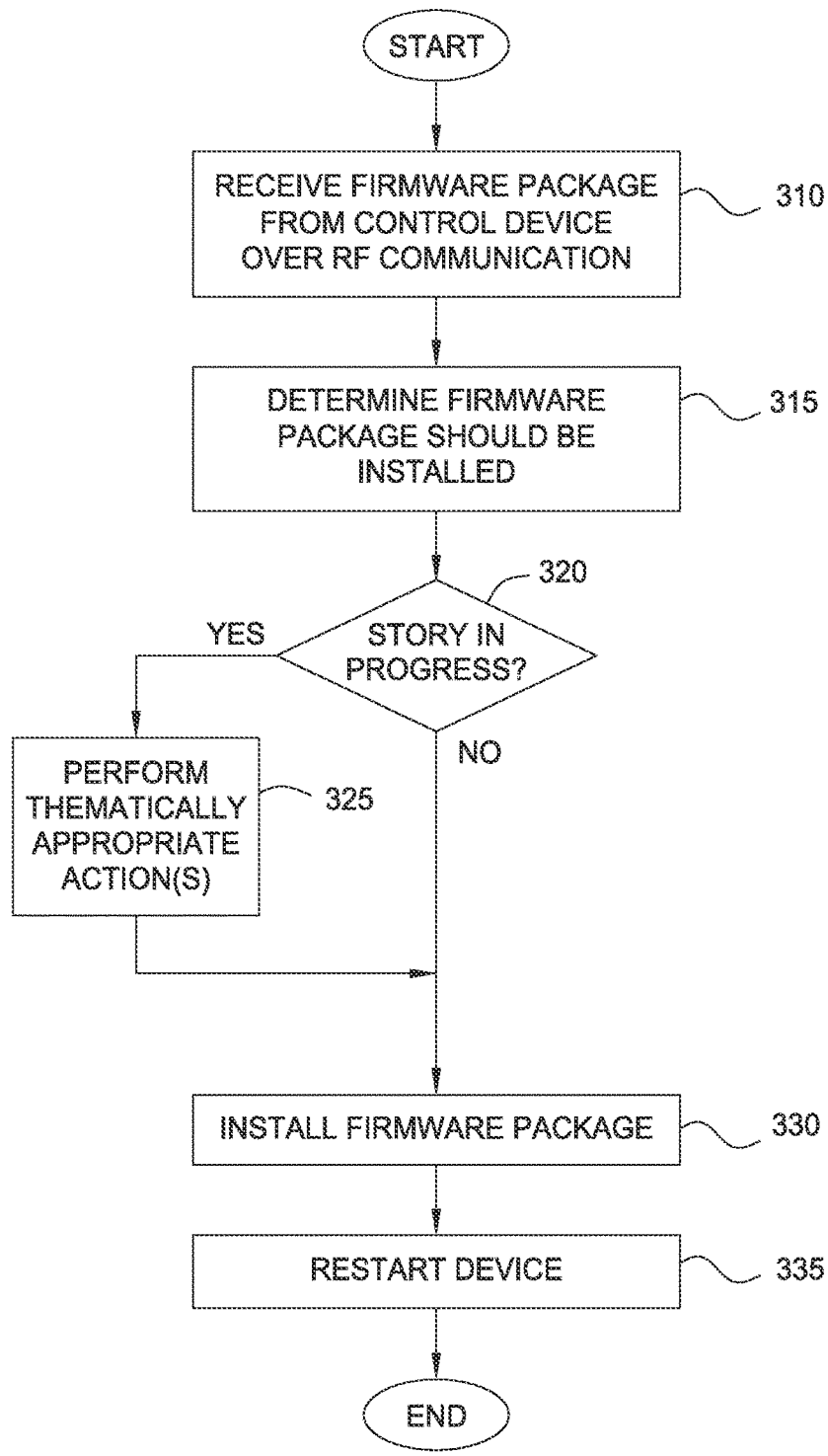
FIG. 3 is a flow diagram illustrating a method of updating firmware on an interactive device, according to one embodiment described herein.

FIG. 3 is a flow diagram illustrating a method of updating firmware on an interactive device, according to one embodiment described herein. As shown, the method 300 begins at block 310, where logic on a first interactive device receives a firmware package from a control device over a RF communication link. Of course, while the depicted example utilizes RF communications to transmit the firmware package, it is broadly contemplated that any suitable communications link can be used consistent with the present disclosure. Examples of other suitable communication links include, without limitation, Bluetooth communications, WiFi communications, and so on.

Upon receiving the firmware package, the logic on the first interactive device determines that the firmware package should be installed (block 315). Of note, the logic could make such a determination immediately upon receiving the firmware, but it is also contemplated the logic could wait for a period of inactivity before determining the firmware should be installed. For instance, if the logic determines a user is currently playing with the device (e.g., based on readings from an accelerometer of the device, based on a current state of an active story, etc.), the logic could determine that the firmware should not be installed at the present moment in time.

In the depicted embodiment, the logic determines whether a story is currently being played out using the interactive device (block 320). If so, the logic causes the device to perform a thematically appropriate action(s) before initiating an install of the firmware (block 325). For example, if the first interactive device is an Iron Man action figure, the logic could cause the device to output dialogue from the character Jarvis indicating that Iron Man's systems are currently failing due to a computer virus and that Jarvis is currently working to combat the virus. More generally, any thematically consistent action can be used so that the firmware update for the device does not unduly interrupt the playback of the story and disrupt the immersive storytelling environment.

Once the action(s) are performed or if the logic determines no story is currently being played using the interactive device, the logic installs the firmware on the device (block 330). Generally, the installed firmware can include any logic or program code on the interactive device, as well as data associated with any such logic or program code. For example, the firmware update could include an updated set of stimulus events the interactive device is able to detect and respond to and could further include audio data for use in outputting additional dialogue options. More generally, it is broadly contemplated that the firmware update can include an update of any logic, program code, or other data on the interactive device. In the depicted embodiment, once the firmware update is installed, the device restarts in order to load the new firmware (block 335) and the method 300 ends. Advantageously, the method 300 allows the device to be updated dynamically without interrupting the storytelling experience.

As discussed above, some storytelling devices are configured with an integrated memory that includes data associated with the storytelling device, but may otherwise lack the ability to provide audiovisual effects and the ability to communicate with remote devices (e.g., due to a desire to provide the storytelling device to consumers at a lower price point). In order to provide this functionality, an action disc device can then be coupled to the storytelling device in order to provide the audiovisual effects and communication links to the other devices. Doing so reduces the total cost incurred by the consumer, as a relatively small number of action disc devices can be shared between a substantial number of storytelling devices.

Figure 4:
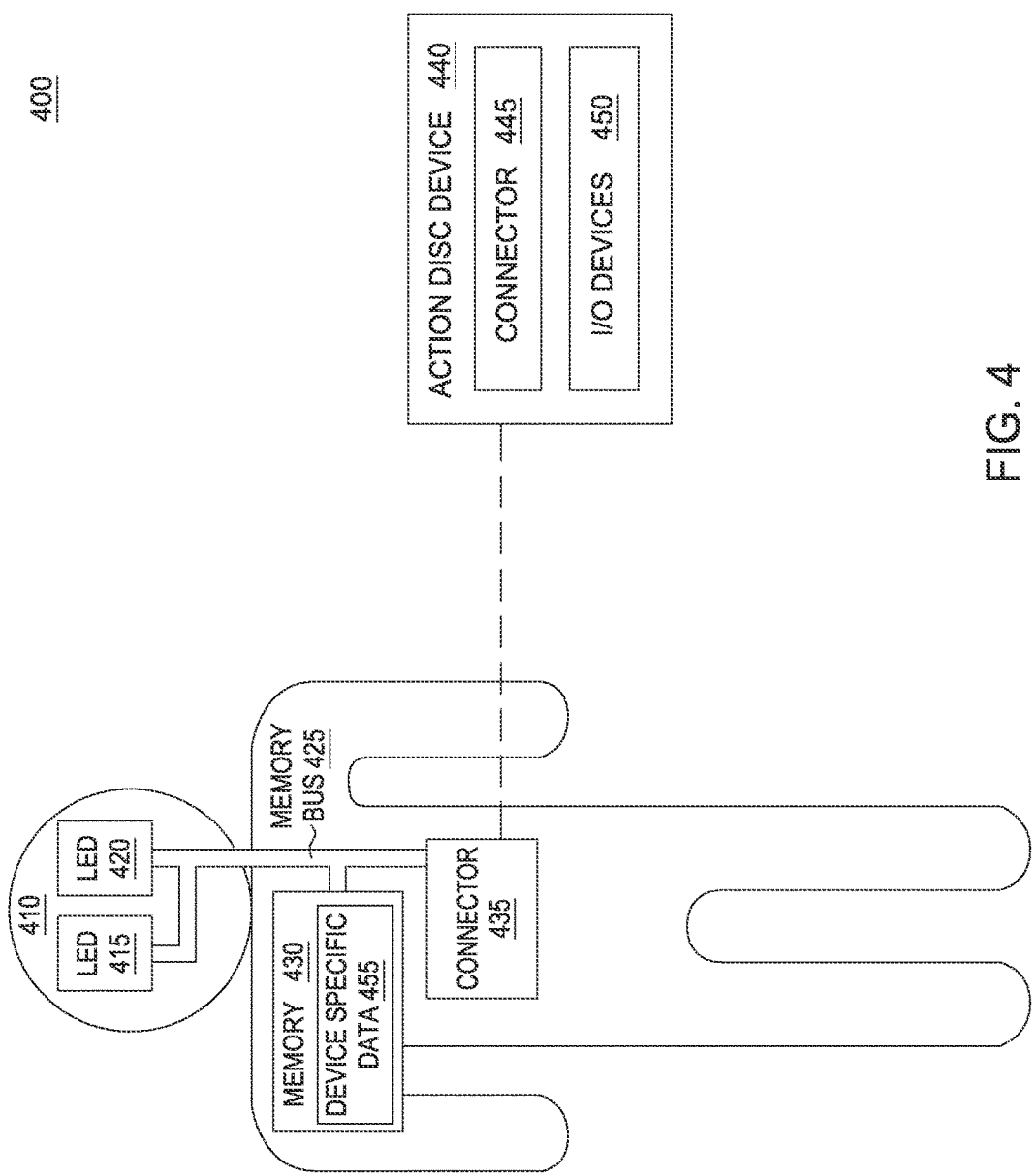
FIG. 4 is a diagram illustrating an interactive device having integrated memory and configured to communicate with an action disc device, according to one embodiment described herein.

FIG. 4 is a diagram illustrating an interactive device having integrated memory and configured to communicate with an action disc device, according to one embodiment described herein. As shown, the system 400 includes a storytelling device 410 and an action disc device 440. The storytelling device 410 includes two light-emitting diodes (LED) 415 and 420, an integrated memory 430 and a connector 435, interconnected via a memory bus 425. For purposes of this example, assume that the LEDs 415 and 420 are positioned behind the eyes of the storytelling device 410 and the eyes are made from a transparent or semi-transparent material(s) to allow at least a portion of the light from the LEDs 415 and 420 to pass through.

The action disc device 440 includes a connector 445 and I/O devices 450. Generally, the connector 445 is adapted to connect to the connector 435 on the storytelling device 410. For example, the connector 445 could be a male connector and the connector 435 could be a female connector. More generally, any type of connectors 435 and 445 can be used, consistent with the functionality described herein. The I/O devices 450 represent any input/output devices on the action disc device, which can include (without limitation) light-emitting devices, speakers, vibration devices, infrared transceivers, RF transceivers, and so on.

Here, while the action disc device 440 is capable of performing many audiovisual effects on behalf of the storytelling device 410 (e.g., outputting sound effects via one or more speakers), there are other audiovisual effects that the action disc device 440 cannot perform strictly by itself and without the aid of the storytelling device 410. An example of such an effect is a glowing effect for the storytelling device's eyes, which may be desirable in, e.g., an Iron Man® action figure. As such, in order to achieve this effect, the action disc device 440 can be configured to power the LEDs 415 and 420 in the storytelling device 410.

In the depicted embodiment, the LEDs 415 and 420 are coupled to the memory bus 425. In order to achieve the glowing effect, the action disc device 440 could manipulate the signal being sent across the memory bus 425 in order to provide power to the LEDs 415 and 420. For example, the action disc device 440 could add a DC offset to the data modulation signal (i.e., the square wave) being sent across the memory bus 425, sufficient to power the LEDs 415 and 420 in the storytelling device 410. As another example, the action disc device 440 could change the voltage spread between the highs and lows of the data modulation signal being sent across the memory bus 425, in order to increase the average voltage passing across the bus 425 to a voltage sufficient to power the LEDs 415 and 420. In one embodiment, the storytelling device 410 is configured with a power source (e.g., a battery) to provide power to the LEDs 415 and 420. In such an embodiment, the circuit connecting the LEDs 415 and 420 with the power source could include a switch that, upon receiving a sufficient voltage, completes the circuit and provides power to the LEDs 415 and 420. In such an example, the action disc device 440 can provide sufficient power to activate the switch across the memory bus 425 (or across another bus), thereby completing the circuit and activating the LEDs 415 and 420. More generally however, it is broadly contemplated that the action disc device can use any technique and/or configuration capable of powering the LEDs 415 and 420, consistent with the present disclosure.

In another embodiment, separate power connections (not shown) can be provided from each of the LEDs 415 and 420 to the connector 435. Here, rather than powering the LEDs 415 and 420 over the memory bus (or completing a circuit, using the memory bus, that powers the LEDs 415 and 420), the action disc device 440 could directly power each of the LEDs 415 and 420 by transmitting power through the corresponding pin of the connector 445, into the connector 435 and across the separate power connection to the respective LED 415 and 420. Such an embodiment may be preferable, for instance, where the storytelling device 410 includes multiple light sources and it is desirable for the action disc device 440 to have the capability to activate only a subset of the multiple light sources within the storytelling device 410 at any particular point in time.

Moreover, the memory 430 includes device specific data 455. As discussed above, such data 455 can include a device identifier (e.g., data identifying the storytelling device 410 as an Iron Man® action figure), audio device, stimulus event data and so on. The action disc device 440 could be configured to read the data 455 from the memory 430 via the connector 445 (when connected to the connector 435, which receives the data using the memory bus 425) and to use the data to generate audiovisual effects using the I/O devices 450. For example, the action disc device 440 could retrieve a particular audio file from the data 455 within the memory 430 and could output the audio file using a speaker device 450 on the action disc device 440. Advantageously, doing so allows the action disc device 440 to be used with a variety of different storytelling devices, without requiring the action disc device 440 to be preconfigured with data relating to any particular storytelling device (e.g., preconfigured with audio data corresponding to the Iron Man® action FIG. 410).

Figure 5:
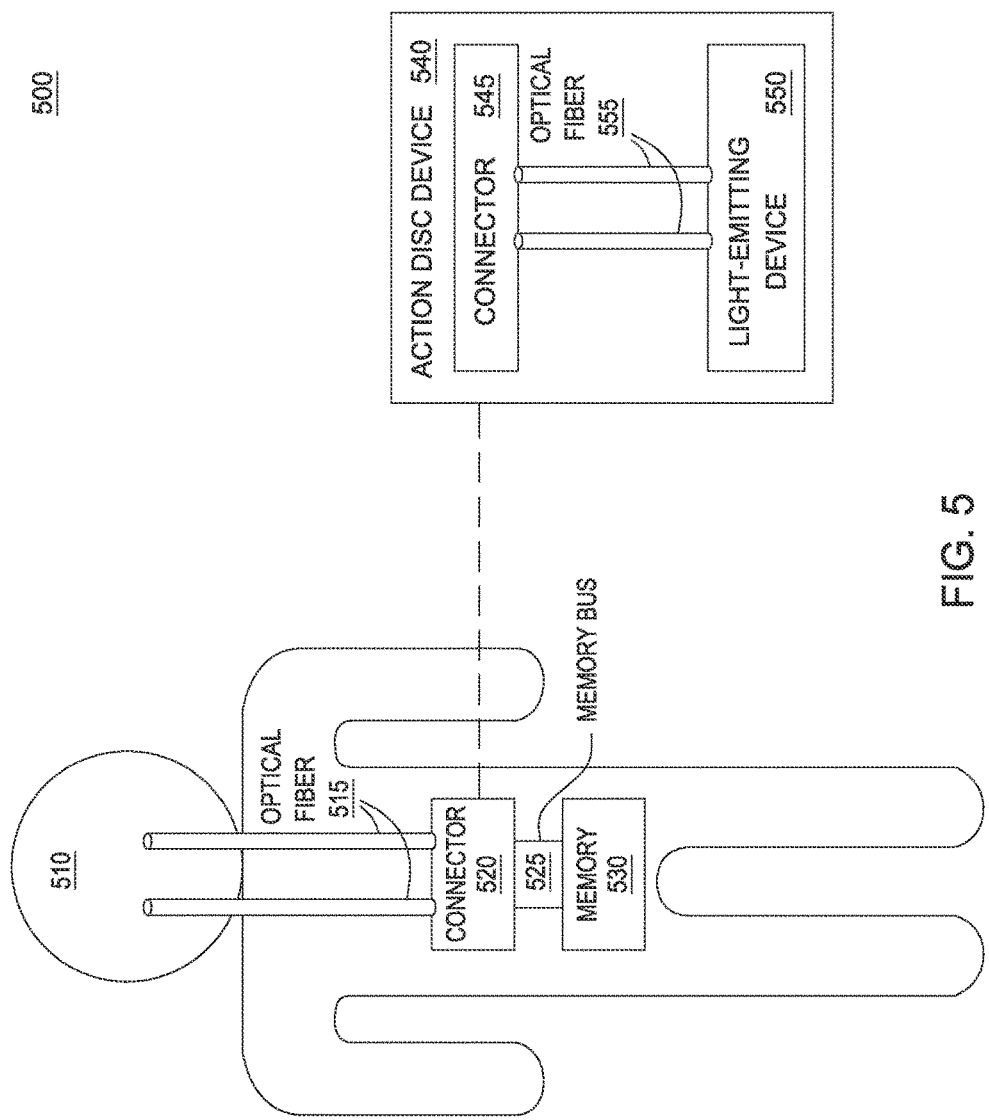
FIG. 5 is a diagram illustrating an interactive device having integrated memory and configured to communicate with an action disc device, according to one embodiment described herein.

In addition to powering LEDs 415 and 420 within a storytelling device 410, the action disc device 440 can be configured to provide a lighting effect within a storytelling device in other ways. FIG. 5 is a diagram illustrating an interactive device having integrated memory and configured to communicate with an action disc device, according to one embodiment described herein. As shown, the system 500 includes a storytelling device 510 and an action disc device 540. The storytelling device 510 includes optical fibers 515 coupled to a connector 520. The connector 520 is also coupled to memory 530 by way of memory bus 525. The action disc device 540 also includes a connector 545 that is coupled to an optical fiber 555 which connects to a light-emitting device 550. For purposes of this example, assume that the optical fiber 515 terminates behind the storytelling device's 510 eyes, and further assume that the device's 510 eyes are made from a transparent or semi-transparent material which allowing light to pass through and be seen by a user.

The connectors 520 and 545 can be configured such that, when connected to one another, light passes from the optical fiber 555 into the optical fiber 515. As such, in order to achieve the glowing effect in the storytelling device's 510 eyes, the action disc device 540 can activate the light-emitting device 550, which generates light that passes into the optical fiber 555. The light then travels to the optical fiber 515, by way of the connector 545 and the connector 520, until the light is ultimately emitted behind the storytelling device's 510 eyes, where it can be seen through the transparent material of the eyes. Moreover, while the depicted system 500 includes two pieces of optical fiber 515 passing to the action figure's 510 eyes, it is broadly contemplated that any number of different pieces of optical fiber can be used within the storytelling device 510 to provide different lighting effects. Likewise, the light-emitting device 550 can be coupled to any number of different optical fibers 555 and can be configured to selectively provide light to only a subset of the optical fibers 555, thus allowing the action disc device 540 to generate light only for selective areas of the storytelling device 510.

Tracking Direction Using Infrared Signals

In one embodiment, a storytelling device is configured to determine the location of another storytelling device, relative to the storytelling device's current position. Such functionality can unlock a number of different possibilities in a storytelling or interactive play experience. For example, in the event the user is wearing or holding the other storytelling device (e.g., wearing a haptic feedback vest, holding a toy blaster rifle, etc.), the storytelling device can in effect determine the user's current position relative to the storytelling device by tracking the position of the storytelling device on the user's person.

Figure 6:
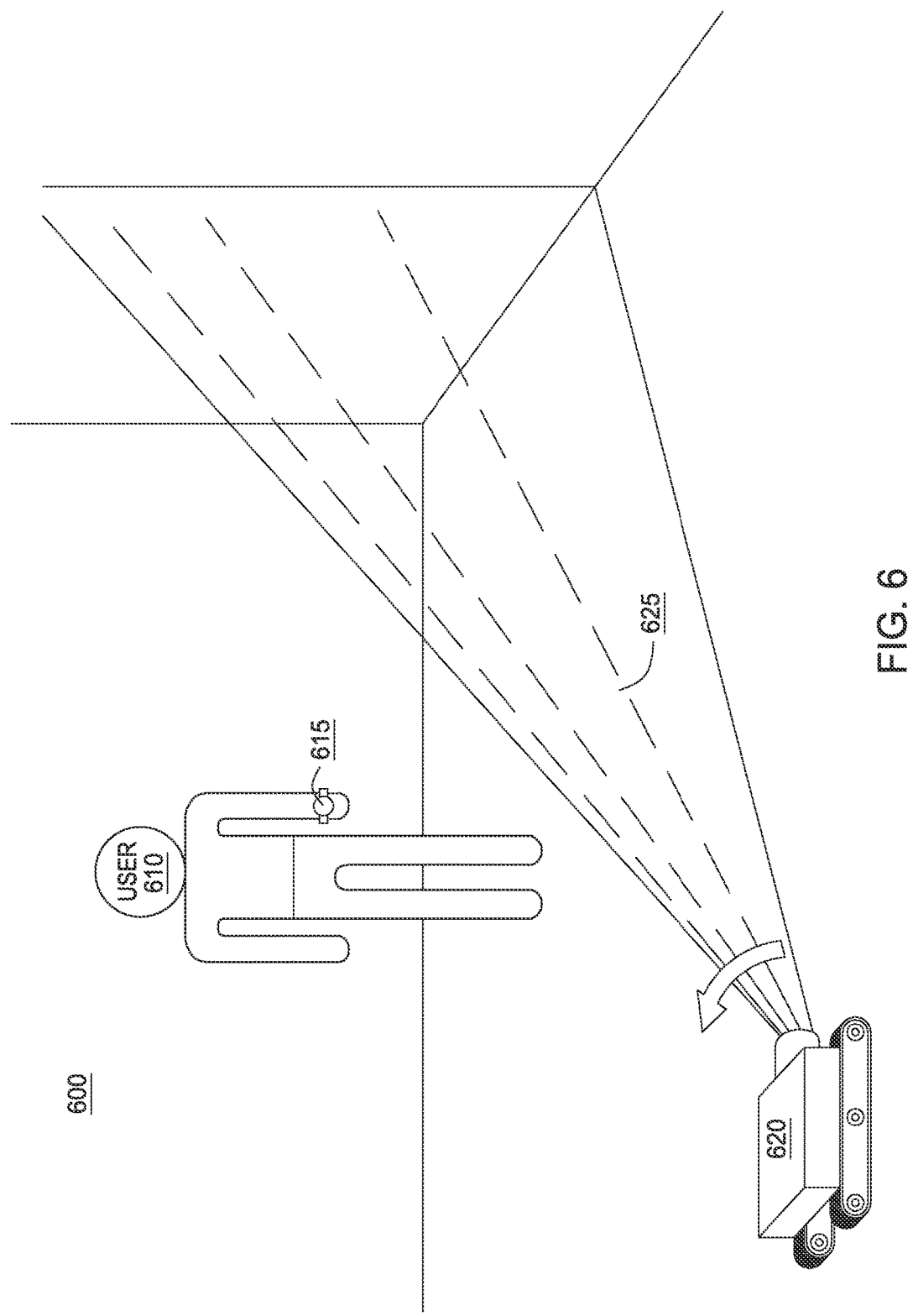
FIG. 6 is a diagram illustrating a method of detecting a direction a second interactive device is located in relative to a first interactive device, according to one embodiment described herein.

FIG. 6 is a diagram illustrating a method of detecting a direction a second interactive device is located in relative to a first interactive device, according to one embodiment described herein. As shown, the scene 600 includes a user 610 wearing a repulsor blaster interactive device 615 and a mobile tank interactive device 620. As shown, the tank device 620 is configured to project a vertical slice of infrared light 625 into the physical environment for use in locating the direction the repulsor blaster 615 is positioned in, relative to the position of the tank device 620. By projecting the infrared light 625 as a vertical slice, embodiments can detect the repulsor blaster's 615 position regardless of its elevation (which, in the depicted example, can be dictated by the user's actions and overall height). In other words, the device 620 can determine the direction with respect to two planes (e.g., the X and Y planes) without working about the third dimension (e.g., the Z plane).

Here, the repulsor blaster device 615 can be configured to broadcast an acknowledgement message (e.g., an infrared signal) upon receiving a polling message from the tank device 620 (i.e., the vertical slice of infrared light 625). For instance, the interactive device 620 can be configured to project the vertical slice of light 625 in a first direction and to then wait for a predetermined period of time for an acknowledgement message from the other interactive device 615. If no acknowledgement message is received, the interactive device 620 could alter the direction in which the vertical slice of infrared light 625 is projected and could then once again project the slice of infrared light 625 in the updated direction. For example, the interactive device 620 could be configured to rotate the projector mechanism a set amount in a counterclockwise direction in order to alter the direction in which the slice of infrared light is projected.

The tank device 620 could repeat this process until the vertical slice of light 625 is received by the repulsor blaster device 615 and the repulsor blaster device 615, in response, broadcasts the acknowledgement message that is then received by the tank device 620. Upon receiving the acknowledgement message, the tank device 620 could determine that the repulsor blaster device 615 is located in the current direction of projection, relative to the position of the tank device 620. The tank device 620 could then perform one or more actions using the determined direction. For example, in a combat storyline where the user 610 is battling the tank device 620 using the repulsor blaster 615, the tank device 620 could be configured to fire virtual lasers at the user (e.g., represented by coded directional infrared signals, together with audiovisual effects) using the determined direction. As another example, the aforementioned technique could be used to improve the realism of dialogue within a storytelling environment, as a storytelling device could turn its head in the determined direction when speaking to the user (or, depending on the story context, when speaking to the other interactive device located in the determined direction). Moreover, as the direction is determined using infrared signals, such a technique can be performed unbeknownst to the user 610.

Once the tank device 620 determines the direction the repulsor blaster 615 is located in, relative to the position of the tank device 620, the tank device 620 can continue pinging the repulsor blaster 615 by projecting the vertical slice of infrared light 625 in the determined direction, in order to ensure the repulsor blaster 615 remains in the determined direction. If at some point no acknowledgement message is received in response to a projected vertical slice of infrared light 625, the tank device 620 could determine that the repulsor blaster 615 (and correspondingly the user wearing the repulsor blaster) has changed position and could begin adjusting the projection direction to find the direction of the repulsor blaster's 615 new position.

In the event the tank device 620 moves towards the repulsor blaster 615 in the determined direction, the tank device 620 can continue pinging the repulsor blaster 615 without updating the direction of projection. In one embodiment, the tank device 620 is configured to dynamically adjust the projection direction based on the tank device's 620 own movement within the physical environment. That is, while the repulsor blaster's 615 position may remain stationary, the tank device 620 could move throughout the physical environment without moving directly towards the repulsor blaster 615. For example, in a combat scenario, the tank device 620 could move in a strafing pattern in order to make it more difficult for the user 610 to score hits on the tank device 620. However, when the tank device 620 moves in such a direction (i.e., a direction that is not directly towards or away from the repulsor blaster 615), the direction of the repulsor blaster 615 from the position of the tank device 620 will change. As such, the tank device 620 could include logic configured to calculate an updated projection direction based on the movement of the tank device 620. The tank device 620 could then project the vertical slice of infrared light 625 in the updated projection direction, in order to compensate for the movement of the tank device 620.

As discussed above, in some embodiments one interactive device (e.g., a more sophisticated interactive device with greater processing capabilities) can control the behavior of another interactive device (e.g., a less sophisticated interactive device with limited logic and processing capabilities). In such an embodiment, the repulsor blaster 615 could, in addition to transmitting an acknowledgement message responsive to receiving the vertical slice of infrared light 625, transmit one or more commands to the tank device 620 specifying actions the tank device 620 should perform. That is, once the repulsor blaster 615 receives the infrared signal 625 from the tank device 620, logic on the repulsor blaster 615 could determine that the tank device 620 is now aware of the direction the repulsor blaster 615 is located in, relative to the tank device's 620 position, and thus could determine that the story should proceed using the known direction. As such, the logic on the repulsor blaster 615 could instruct the tank device 620 (e.g., by transmitting an infrared signal, an RF signal, etc.) to approach the repulsor blaster 615 by moving in the determined direction.

In one embodiment, the repulsor blaster 615 is configured to transmit additional positional information to the tank device 620. For instance, the repulsor blaster 615 could be configured with one or more accelerometer devices that can be used to detect when the user 610 is stationary and when the user is moving throughout the physical environment. As an example, the repulsor blaster 615 could use this information to determine when the user has stopped moving and, in response, to instruct the mobile tank device 620 (e.g., via an infrared signal, RF signal, or other communications medium) to begin searching for the direction the repulsor blaster 615 is located in by sweeping the physical environment with the vertical slice of infrared light 625.

Figure 7:
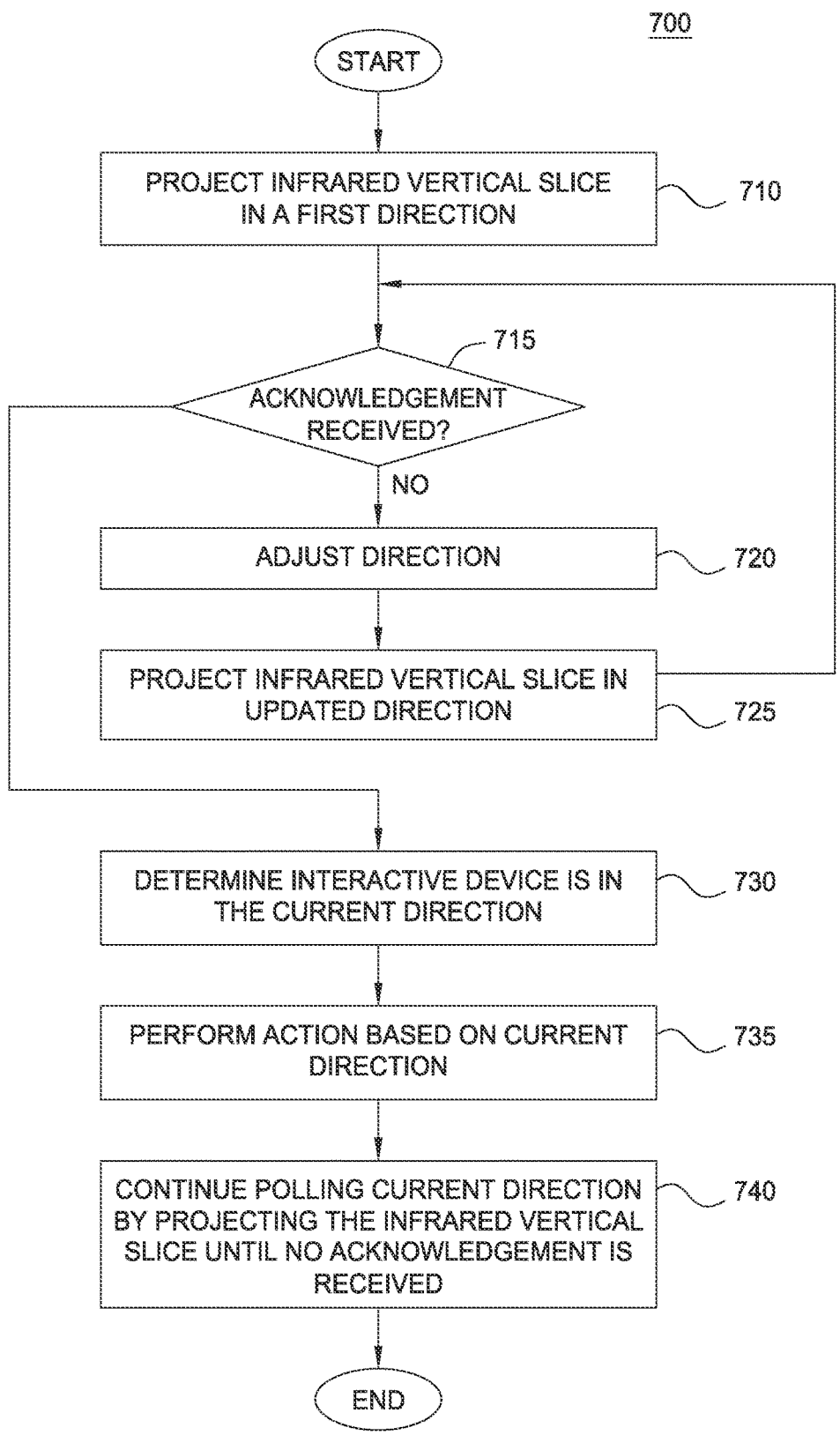
FIG. 7 is a flow diagram illustrating a method of determining a direction in which another interactive device is located, according to one embodiment described herein.

FIG. 7 is a flow diagram illustrating a method of determining a direction in which another interactive device is located, according to one embodiment described herein. As shown, the method 700 begins at block 710, where logic on a first interactive device causes an infrared emitter to project a vertical slice of infrared light in a first direction. Here the infrared light is shaped as a vertical slice in order to detect other interactive devices regardless of their elevation. For example, if the other interactive device is currently being worn by a user, embodiments are adapted to project a vertical slice of infrared light to detect the other interactive device regardless of the user's height.

The logic on the first interactive device then determines whether an acknowledgement was received responsive to the projected vertical slice (block 715). For example, the acknowledgement could be a data packet received by the first interactive device by way of infrared communications. In one embodiment, the logic is configured to pause a predetermined period of time to wait for the acknowledgement message before determining whether the message has been received.

If no acknowledgement is received, the logic adjusts the direction in which the interactive device projects the vertical slice of infrared light (block 720). For example, the logic could cause a mechanism on the device to rotate in a clockwise direction in order to adjust the direction in which the light will be projected. The logic then projects another slice of infrared light in the updated direction (block 725), and the method 700 returns to block 715 where the logic again determines whether an acknowledgement has been received responsive to the projection.

Once an acknowledgement is received, the logic determines that the other interactive device is located in the direction in which the vertical slice of infrared light was last projected (block 730). The logic then causes the interactive device to perform an action based on the determined direction (block 735). For example, in a particular story, the logic could cause the interactive device to begin walking in the determined direction. As another example, the logic could cause the interactive device to fire virtual repulsor blasts (e.g., simulated using a sound effect and a projected infrared signal) in the determined direction.

The logic then continues polling the determined direction by projecting vertical slices of infrared light until no acknowledgement is received (block 740), and the method 700 ends. That is, the logic can continue polling the determined direction to determine when the other interactive device moves (i.e., when no acknowledgement is received responsive to the projected vertical slice). If the logic determines the other interactive device has changed position, the logic could employ the method 700 to once again determine the other interactive device's position. Doing so allows the interactive device to maintain knowledge of the direction of the other interactive device relative to the current position of the interactive device without alerting the user to this fact (i.e., due to the user's inability to see the projected infrared light).

Technical Description

Figure 8:
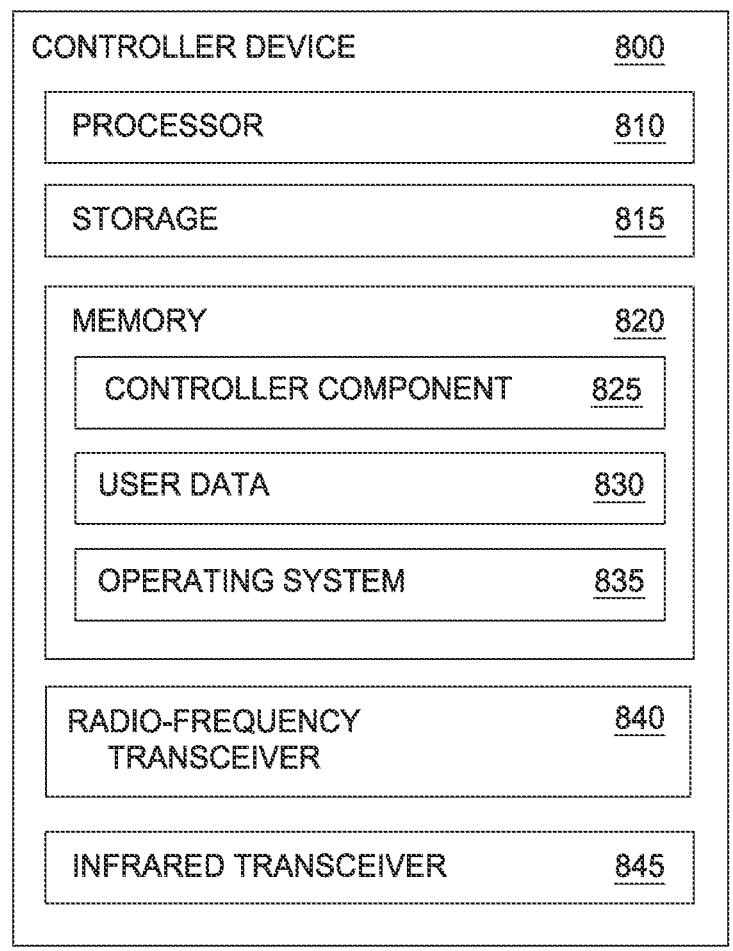
FIG. 8 is a block diagram illustrating a controller device, according to one embodiment described herein.

FIG. 8 illustrates an example of a controller device, according to one embodiment described herein. As shown, the controller 800 includes a processor 810, storage 815, memory 820, a radio-frequency transceiver 840 and an infrared transceiver 845. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The radio-frequency transceiver 840 enables the controller device 800 to transmit and receive radio-frequency signals. Likewise, the infrared transceiver 845 allows the device 800 to transmit and receive infrared signals. Further, while the depicted embodiment illustrates the components of a particular controller device 800, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the controller device 800. Illustratively, the memory 820 includes a controller component 825, user data 830 and an operating system 835. The operating system 835 generally controls the execution of application programs on the controller device 800. Examples of operating system 835 include UNIX, a version of the Microsoft Windows® operating system, and distributions of the Linux® operating system. Additional examples of operating system 835 include custom operating systems for gaming consoles, including the custom operating systems for systems such as the Nintendo DS® and Sony PSP®.

Generally, the controller component 825 configures the interactive objects (e.g., toys 110, 115 and 120, or an action disc device) to perform particular actions. The particular actions can also be based on the user data 830 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 825 is configured with logic for recognizing particular events and broadcasting commands for the devices to perform a corresponding action(s) in response. In such an embodiment, the controller component 825 could use input/output devices (e.g., cameras, microphones, wireless transceivers, infrared sensors, etc.) to detect when a particular event occurs. For instance, the controller component 825 could use a camera to detect when a particular projection appears, and could then broadcast a command (e.g., using a RF signal) instructing the devices to perform a corresponding action in response. As another example, the controller component 825 could receive a wireless signal (e.g., an RF signal, data communicated using Bluetooth communications, etc.) from another one of the devices, indicating that a particular action has been performed. The device could then broadcast a signal instructing one or more other devices to perform a corresponding action responsive to receiving the signal.

In a particular embodiment, the controller component 825 is configured to control the actions of multiple devices to cause the devices to perform audiovisual effects synchronously. For instance, the controller component 825 could broadcast a message to the devices, instructing the devices to perform a particular audiovisual effect immediately upon receiving the message. As another example, the controller component 825 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

As discussed above, the controller component 825 can be configured to update the firmware of a storytelling device by transmitting a firmware package to the storytelling device by way of RF communications. The storytelling device, upon receiving the firmware package, could then be configured to install the firmware package and restart itself to load the new firm.

Generally speaking, the devices and the controller 800 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Figure 9:
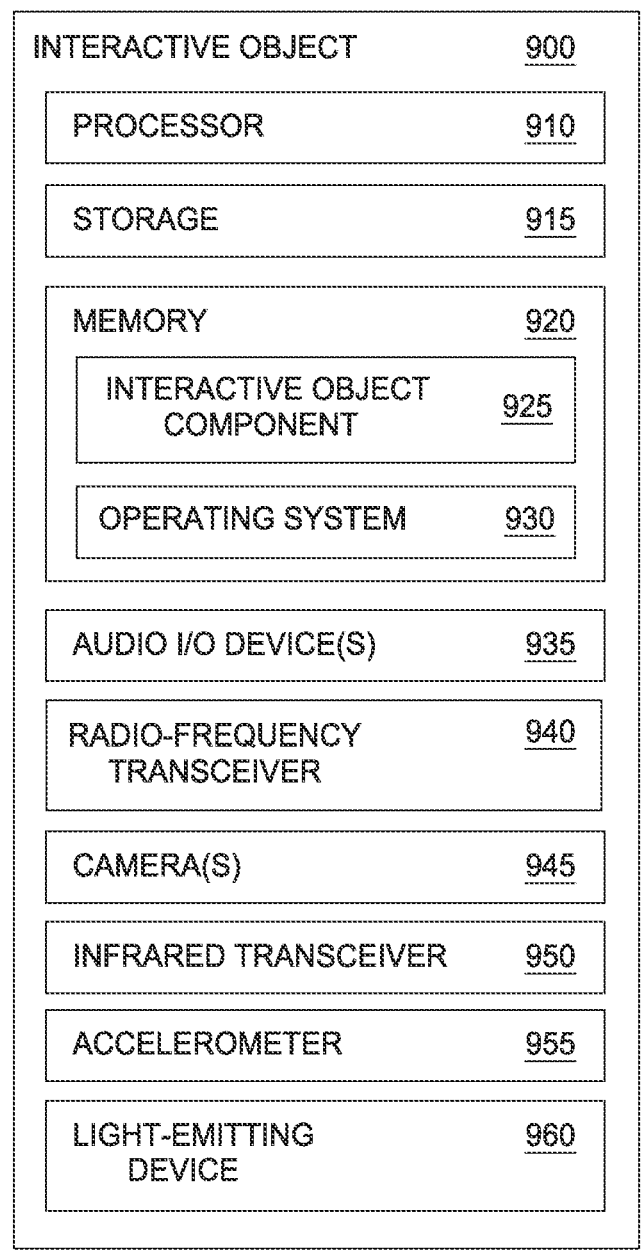
FIG. 9 is a block diagram illustrating an interactive object, according to one embodiment described herein.

An example of an interactive device is shown in FIG. 9, which is a block diagram illustrating an interactive device configured with an interactive object component, according to one embodiment described herein. In this example, the device 900 includes, without limitation, a processor 910, storage 915, memory 920, audio input/output (I/O) device(s) 935, a radio-frequency (RF) transceiver 940, a camera device(s) 945, an infrared transceiver 950, an accelerometer device 955, and a light-emitting device 960. Generally, the processor 910 retrieves and executes programming instructions stored in the memory 920. Processor 910 is included to be representative of a single CPU, multiple CPUs, a single CPU having multiple processing cores, GPUs having multiple execution paths, and the like. The memory 920 is generally included to be representative of a random access memory. The radio-frequency transceiver 940 enables the interactive object component 925 to connect to a data communications network (e.g., wired Ethernet connection or an 802.11 wireless network). As discussed above, the interactive device may include one or more battery devices (not shown).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 9, the memory 920 represents any memory sufficiently large to hold the necessary programs and data structures. Memory 920 could be one or a combination of memory devices, including Random Access Memory, nonvolatile or backup memory (e.g., programmable or Flash memories, read-only memories, etc.). In addition, memory 920 and storage 915 may be considered to include memory physically located elsewhere; for example, on another computer communicatively coupled to the interactive device 900. Illustratively, the memory 920 includes an interactive object component 925 and an operating system 930. The interactive object component 925 could be configured to receive commands (e.g., encoded in RF or infrared signals) and to execute the commands to perform audiovisual effects. In one embodiment, the interactive object component 925 is configured to decrypt the commands using a received key before executing the commands. The operating system 930 generally controls the execution of application programs on the interactive device 900. Examples of operating system 930 include UNIX, a version of the Microsoft Windows® operating system, and distributions of the Linux® operating system. Additional examples of operating system 930 include custom operating systems for gaming consoles, including the custom operating systems for systems such as the Nintendo DS® and Sony PSP®.

The infrared transceiver 950 represents any device capable of sending and receiving infrared signals. In another embodiment, a device 900 that only sends or receives infrared signals may be configured with an infrared transmitter or a infrared receiver, respectively, as opposed to the infrared transceiver 950. The sound I/O devices 935 could include devices such as microphones and speakers. For example, the speakers could be used to produce sound effects (e.g., explosion sound effects, dialogue, etc.) and/or to produce vibration effects.

Generally, the interactive object component 925 provides logic for the interactive device 900. For example, the interactive object component 925 could be configured to detect that a coded infrared signal has been received (e.g., using the infrared transceiver 950). The interactive object component 925 could then determine a type of the infrared signal (e.g., based on data specified within the coded infrared signal) and could determine a corresponding response based on determined type. For example, the interactive object component 925 could determine that the infrared signal specifies that a repulsor ray blast sound effect should be played, and, in response, could output the specified sound effect using audio I/O devices 935. As another example, the signal could be encoded with data specifying that a particular lighting effect should be displayed according to a specified schedule (e.g., at a particular point in time), and the interactive object component 925 could monitor the schedule (e.g., using an internal clock) and could activate the appropriate light-emitting device 960 at the appropriate time.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A toy device, comprising:
a memory storing data representing a plurality of effects;
a memory bus communicatively coupled to the memory;
a communication port communicatively coupled to the memory bus, wherein an action disc device connected to the communication port can retrieve at least a portion of the stored data for playback over the communication port, and wherein the action disc device is configured to, upon detecting that a corresponding stimulus condition has been satisfied, retrieve data from the memory corresponding to one of the plurality of effects for playback using the communication port;
a connector mechanism to which the action disc device can be removably attached, while the action disc device is connected to the communication port;
one or more surfaces adapted to allow light to pass through; and
a light-emitting diode configured to emit light through the one or more surfaces, wherein the light source is powered using at least one of (i) a power source of the action disc device and (ii) a battery connected to the light-emitting diode and configured to power the light-emitting diode only upon receipt of a control signal from the action disc device on the communication port.

2. The method of claim 1, wherein the light source comprises one or more optical fibers coupled at a first end to the communication port and coupled at a second end to the one or more surfaces, wherein the action disc device connected to the communication port can transmit light through the one or more optical fibers to be emitted through the one or more surfaces.

3. The toy device of claim 1, wherein a first one of the plurality of effects comprises an audio effect, and wherein the action disc device is configured to, upon detecting that the corresponding stimulus condition has been satisfied, retrieve the data corresponding to the audio effect for playback, and wherein the action disc device is further configured to output the retrieved audio effect using one or more speaker devices on the action disc device.

4. The toy device of claim 1, wherein the memory further stores data describing one or more stimulus events, wherein each of the one or more stimulus events comprises a respective stimulus condition and a respective action to be performed upon satisfaction of the stimulus condition.

5. The toy device of claim 4, wherein the action disc device is further configured to: retrieve the data describing the one or more stimulus events;
monitor data received from one or more sensor devices on the action disc device to determine when the respective stimulus condition of a first one of the one or more stimulus events is satisfied; and
in response, perform the respective action corresponding to the satisfied stimulus condition, using the retrieved data corresponding to one of the plurality of effects.

6. The toy device of claim 1, wherein the memory further stores data that uniquely identifies a class of the toy device.

7. The toy device of claim 6, wherein the action disc device is further configured to:
retrieve the data that uniquely identifies the class of the toy device;
determine one or more stimulus events corresponding to the class of the toy device, based on the retrieved data that uniquely identifies the class of the toy device, wherein each of the one or more stimulus events comprises a respective stimulus condition and a respective action to be performed upon satisfaction of the stimulus condition.

8. The toy device of claim 7, wherein the action disc device is further configured to:
monitor data received from one or more sensor devices on the action disc device to determine when the respective stimulus condition of a first one of the determined one or more stimulus events is satisfied; and
in response, perform the respective action corresponding to the satisfied stimulus condition, using the retrieved data corresponding to one of the plurality of effects.

9. An action disc device, comprising:
one or more output devices;
a communications adapter for communicatively connecting to a communication port of a toy device;
a connector mechanism for removably attaching the action disc device to a toy device, while the action disc device is connected to a communication port of the toy device;
a power source;
a light source connected to the power source and positioned to emit light into one or more optical fibers of the toy device, when the connector mechanism is removably attached to the toy device; and
logic configured to:
detect the communications adapter is connected to a first communication port of the toy device;
retrieve, using the communications adapter, effect data stored within a memory of the toy device for playback; and
upon detecting that a corresponding stimulus condition has been satisfied, output the retrieved effect data for playback using the one or more output devices.

10. The action disc device of claim 9, wherein the power source is connected to the communications adapter, such that the power source can power one or more light-emitting diodes within the toy device, when the connector mechanism is removably attached to the toy device.

11. The action disc device of claim 9, wherein the logic is further configured to transmit a control signal to the toy device using the communications adapter, and wherein the toy device is configured to power one or more light-emitting diodes within the toy device using a battery of the toy device, only upon receipt of the control signal.

12. The action disc device of claim 9, wherein the effect data comprises data representing an audio effect, wherein the one or more output devices include a speaker device, and wherein the logic configured to output the retrieved effect data for playback is configured to output the data representing the audio effect for playback using the speaker device.

13. The action disc device of claim 9, wherein the logic is further configured to:
retrieve, using the communications adapter, stimulus event data stored within a memory of the toy device, wherein the stimulus event data describes one or more stimulus events, wherein each of the one or more stimulus events comprises a respective stimulus condition and a respective action to be performed upon satisfaction of the stimulus condition.

14. The action disc device of claim 13, further comprising:
one or more sensor devices, and
wherein the logic is further configured to:

monitor data received from the one or more sensor devices to determine when the respective stimulus condition of a first one of the one or more stimulus events is satisfied; and in response, perform the respective action corresponding to the satisfied stimulus condition, using the effect data retrieved from the memory of the toy device.

15. The action disc device of claim 9, further comprising one or more sensor devices, wherein the memory within the toy device further stores data that uniquely identifies a class of the toy device, and wherein the logic is further configured to:

retrieve, using the communications adapter, the data that uniquely identifies the class of the toy device from the memory of the toy device;

determine one or more stimulus events corresponding to the class of the toy device, based on the retrieved data that uniquely identifies the class of the toy device, wherein each of the one or more stimulus events comprises a respective stimulus condition and a respective action to be performed upon satisfaction of the stimulus condition;

monitor data received from the one or more sensor devices to determine when the respective stimulus condition of a first one of the determined one or more stimulus events is satisfied; and in response, perform the respective action corresponding to the satisfied stimulus condition, using the retrieved effect data.

16. A toy device, comprising:
a memory storing (i) data representing a plurality of effects and (ii) data describing one or more stimulus events, wherein each of the one or more stimulus events comprises a respective stimulus condition and a respective action to be performed upon satisfaction of the stimulus condition;
a memory bus communicatively coupled to the memory;
a communication port communicatively coupled to the memory bus, wherein an action disc device connected to the communication port can retrieve at least a portion of the stored data for playback over the communication port, and wherein the action disc device is configured to, upon detecting that a corresponding stimulus condition has been satisfied, retrieve data from the memory corresponding to one of the plurality of effects for playback using the communication port; and
a connector mechanism to which the action disc device can be removably attached, while the action disc device is connected to the communication port.

17. A toy device, comprising:
a memory storing data representing a plurality of effects;
a memory bus communicatively coupled to the memory;
a communication port communicatively coupled to the memory bus, wherein an action disc device connected to the communication port can retrieve at least a portion of the stored data for playback over the communication port, and wherein the action disc device is configured to, upon detecting that a corresponding stimulus condition has been satisfied, retrieve data from the memory corresponding to one of the plurality of effects for playback using the communication port;
a connector mechanism to which the action disc device can be removably attached, while the action disc device is connected to the communication port;
one or more external surfaces; and
a light source comprising one or more optical fibers coupled at a first end to the communication port and coupled at a second end to the one or more external surfaces, wherein the action disc device connected to the communication port can transmit light through the one or more optical fibers to be emitted through the one or more external surfaces.

18. An action disc device, comprising:
one or more output devices;
a communications adapter for communicatively connecting to a communication port of a toy device;
a connector mechanism for removably attaching the action disc device to a toy device, while the action disc device is connected to a communication port of the toy device;
a power source connected to the communications adapter, such that the power source can power one or more light-emitting diodes within the toy device, when the connector mechanism is removably attached to the toy device; and
logic configured to:
detect the communications adapter is connected to a first communication port of the toy device;
retrieve, using the communications adapter, effect data stored within a memory of the toy device for playback; and
upon detecting that a corresponding stimulus condition has been satisfied, output the retrieved effect data for playback using the one or more output devices.

* * * * *

UNITED STATES PATENT AND TRADEMARK OFFICE
CERTIFICATE OF CORRECTION

PATENT NO. : 9,770,651 B2  
APPLICATION NO. : 14/633085  
DATED : September 26, 2017  
INVENTOR(S) : Joseph L. Olson et al.

Page 1 of 1

It is certified that error appears in the above-identified patent and that said Letters Patent is hereby corrected as shown below:

In the Claims

In Column 19, Line 29, in Claim 2, delete "method" and insert -- toy device --, therefor.

Signed and Sealed this
Third Day of April, 2018

Andrei Iancu
*Director of the United States Patent and Trademark Office*